United States Patent
Graf et al.

(10) Patent No.: US 9,067,275 B2
(45) Date of Patent: Jun. 30, 2015

(54) WELDING DEVICE AND METHOD FOR WELDING

(75) Inventors: Thomas Graf, Nufringen (DE); Andreas Josef Birnesser, Rheinmuenster (DE)

(73) Assignee: ROBERT BOSCH GMBH, Stuttgart (DE)

( * ) Notice: Subject to any disclaimer, the term of this patent is extended or adjusted under 35 U.S.C. 154(b) by 392 days.

(21) Appl. No.: 13/701,873

(22) PCT Filed: May 23, 2011

(86) PCT No.: PCT/EP2011/058366
§ 371 (c)(1),
(2), (4) Date: Feb. 12, 2013

(87) PCT Pub. No.: WO2011/151214
PCT Pub. Date: Dec. 8, 2011

(65) Prior Publication Data
US 2013/0146567 A1  Jun. 13, 2013

(30) Foreign Application Priority Data
Jun. 4, 2010 (DE) .................. 10 2010 029 694

(51) Int. Cl.
*B23K 26/04* (2014.01)
*B23K 26/20* (2014.01)
*B23K 15/02* (2006.01)
*B23K 26/02* (2014.01)
*B23K 26/03* (2006.01)
*B23K 26/30* (2014.01)

(52) U.S. Cl.
CPC .................. *B23K 15/02* (2013.01); *B23K 26/20* (2013.01); *B23K 26/02* (2013.01); *B23K 26/03* (2013.01); *B23K 26/04* (2013.01); *B23K 26/428* (2013.01)

(58) Field of Classification Search
CPC .................................. B23K 26/04; B23K 26/20
USPC ......... 219/121.61–121.64, 121.83; 445/3, 63; 385/120
See application file for complete search history.

(56) References Cited

U.S. PATENT DOCUMENTS

| 4,673,795 A | 6/1987 | Ortiz |
| 5,681,490 A * | 10/1997 | Chang .................. 219/121.64 |
| 2011/0100965 A1 * | 5/2011 | Yano et al. ............... 219/121.64 |

FOREIGN PATENT DOCUMENTS

| CN | 101797663 | 8/2010 |
| DE | 10 2008 002263 | 12/2009 |
| DE | 10 2008 047140 | 3/2010 |
| JP | 2000-271768 | 10/2000 |
| JP | 2006 043741 | 2/2006 |
| WO | 99/14640 | 3/1999 |
| WO | 2008/070784 | 6/2008 |

* cited by examiner

Primary Examiner — Samuel M Heinrich
(74) Attorney, Agent, or Firm — Kenyon & Kenyon LLP

(57) ABSTRACT

A welding device has a beam source to generate electromagnetic beams for absorption in an object to be welded at a welding location, and at least one sensor situated to detect electromagnetic process beams generated during welding at the welding location. The sensor is to generate a sensor signal as a function of the detected process beams. The welding device also has a processing unit, which is connected to the sensor and the beam source, the processing unit being configured to control at least one parameter of the beam generation of the beam source as a function of the sensor signal. The welding device is to delimit by a window a beam bundle of the emitted process beams in a plane transverse to the beam propagation direction; in the plane, the window has a longitudinal dimension greater than a transversal dimension of the window perpendicular to the longitudinal dimension.

10 Claims, 3 Drawing Sheets

WELDING DEVICE AND METHOD FOR WELDING

FIELD OF THE INVENTION

The present invention relates to a welding device.

BACKGROUND INFORMATION

The welding device has a beam source, the beam source being configured to generate electromagnetic beams for absorption in an object to be welded at a welding location. The welding device also has at least one sensor, the sensor being situated and configured to detect electromagnetic process beams generated during welding at the welding location. The sensor is configured to generate a sensor signal as a function of the detected process beams. The welding device also has a processing unit, which is connected to the sensor and the beam source, the processing unit being configured to control at least one parameter of the beam generation of the beam source as a function of the sensor signal. The beam source is, for example, formed by a laser, in particular a carbon dioxide laser, a YAG laser, or a semiconductor laser. The beam source may be configured to generate electromagnetic beams for absorption into the object to be welded in such a way that the object to be welded may be connected to another object at the welding location.

In the welding device of above, the problem may arise that it may only detect gross process errors.

SUMMARY OF THE INVENTION

The welding device is configured according to the present invention to delimit by a window a beam bundle of the emitted process beams in a plane transverse to the beam propagation direction; in the plane, the window has a longitudinal dimension which is greater than a transversal dimension of the window which is perpendicular to the longitudinal dimension.

With the aid of the window, the process beams, which are emitted by a keyhole area of the welding location, may be advantageously detected by the sensor and may be used by the processing unit as a controlled input variable for controlling the welding process. The quality of the welding result is thus advantageously improved. It is furthermore advantageous that it is possible to better reproduce the welding result. It is furthermore advantageous that the welding results produced in this way have only a slight deviation among each other, in particular only small differences with regard to the welded seam depth and the welded seam surface.

The at least one parameter of the beam generation may, for example, be a beam intensity, a current for generating the electromagnetic beams, in particular laser beams, a beam pulse duration of a beam pulse of a pulsed laser radiation or a mean beam intensity of a pulsed laser radiation within a time interval.

In one specific embodiment, the welding device has a beam-guiding arrangement which is configured to guide the process beams emitted from the welding location onto the sensor. The beam-guiding arrangement may, for example, be configured as a glass fiber bundle which is configured and situated to guide the emitted process beams from the welding location to the sensor. With the aid of the beam-guiding arrangement, the sensor may be advantageously protected against heat radiation emitted from the welding location or against spark formation.

In one advantageous specific embodiment of the welding device, a beam splitter is situated in the beam path between the beam source and the welding location. The beam splitter is configured to transmit the electromagnetic beams emitted by the beam source to the welding location, to reflect the process beams emitted from the welding location, and to direct them at least indirectly onto the sensor. The beam splitter may, for example, be configured as a semi-reflective mirror. The beam splitter advantageously results in that the process beams may be received at a distance from the welding location.

In one specific embodiment, the window is formed by a diaphragm in the beam path of the process beams. The diaphragm may, for example, be situated between the welding location and the beam splitter, between the beam splitter and the sensor, or between the beam splitter and the beam-guiding arrangement.

In one specific embodiment of the welding device, the window is formed by a particularly flexibly configured glass fiber bundle having a window-shaped beam entrance cross section. By designing the window with the aid of the glass fiber bundle having a window-shaped beam entrance cross section, separate diaphragms may advantageously be dispensed with in the beam path so that, furthermore advantageously, for guiding the process beams with the aid of the beam-guiding arrangement to the sensor, a complete cross section of the beam-guiding arrangement may be used to guide the process beams. The beam-guiding arrangement may, for example, have an exit plane transverse to the beam direction, the exit plane having a different shape than the beam entrance cross section, for example, a round shape.

In one specific embodiment, the window has an oval cross section. It has been recognized according to the present invention that the process beams which are emitted by a keyhole area and proceed in the opposite direction of the beam incidence direction of the electromagnetic beams emitted by the beam source penetrate, in a plane perpendicular to the beam incidence direction of the electromagnetic beams, a surface area having an oval or an elliptical shape at an essentially identical beam density in the plane.

When these process beams are detected with the aid of a glass fiber bundle or a sensor having a round beam entrance window, only some of the process beams are used to be received as input parameters for the control of the welding process.

The welding device may, for example, have two differing sensors for detecting the process beams. The sensors may have differing spectral sensitivities for the process beams. In this way, other parameters may advantageously be formed for controlling the welding process.

The present invention also relates to a method for welding, in particular for controlling a welding process.

In the method for controlling the welding, electromagnetic beams, in particular laser beams, are generated and transmitted onto at least one object at a welding location in order to be absorbed at least partially at the welding location, to heat up the object at the welding location, and to melt it at least partially. In the method, electromagnetic process beams emitted from the welding location are detected and at least one parameter of the generation of the electromagnetic beams is changed as a function of the detected process beams, thus influencing the welding process, in particular a result of the welding process. In the method, the process beams may be delimited by a window in a plane transverse to the beam propagation direction so that only the process beams emitted by a keyhole at the welding location are detected for influencing the welding.

The parameter may be a beam intensity of the electromagnetic beams. In another specific embodiment, the electromagnetic beams are pulsed, and the parameter is one pulse duration of one individual pulse of the pulsed electromagnetic beams.

The present invention will now be explained in the following with reference to the figures and other exemplary embodiments. Other advantageous specific embodiments of the welding device and the method result from the features stated in the dependent claims as well as from the features stated in the description of the figures.

DETAILED DESCRIPTION

Figure 1:
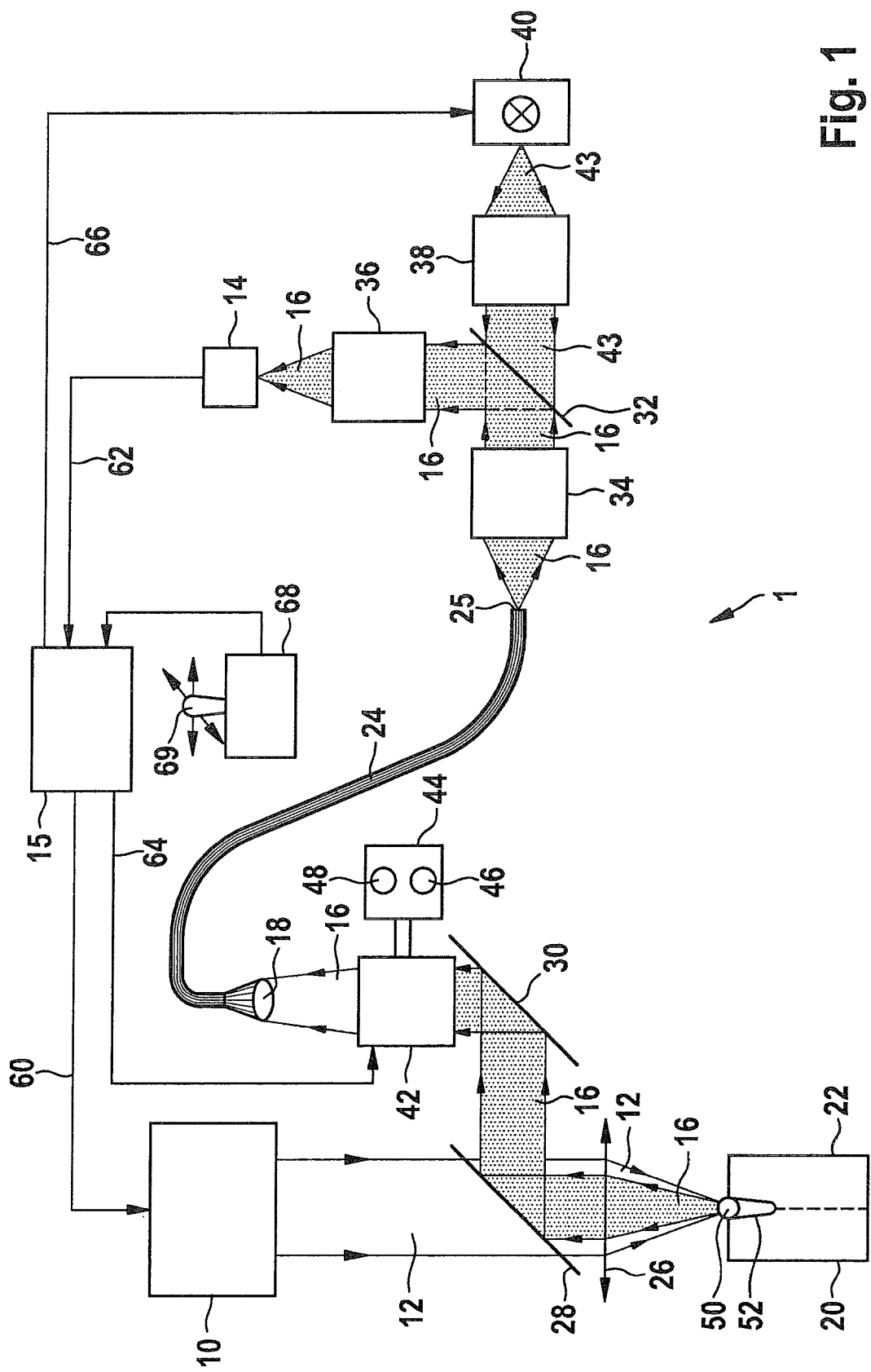
FIG. 1 schematically shows an exemplary embodiment for a welding device which is configured to evaluate process beams, which are emitted by a keyhole area, with the aid of an elliptical window and to forward them to a sensor.

FIG. 1 shows a welding device 1. Welding device 1 has a beam source 10. Beam source 10 is formed by a laser in this exemplary embodiment. Beam source 10 is configured to generate and emit electromagnetic beams 12 which may be absorbed at a welding location of an object 20 to be welded and which are able to melt at least one material of the object to be welded at the welding location. The welding device also has a sensor 14 which is configured to detect process beams 16 emitted from welding location 50 and to generate a sensor signal as a function of the detected process beams, the sensor signal representing a beam intensity of the detected process beams.

Welding device 1 is configured to direct process beams 16 onto a window 18 with the aid of a beam splitter 28 and a beam deflection arrangement, in particular a deflecting mirror 30, as well as with the aid of a focusing unit 42. Window 18 is formed by a beam entrance area of a beam-guiding arrangement 24. Beam-guiding arrangement 24 is formed by a glass fiber bundle which is configured to be flexible, in particular, and which is configured to guide process beams 16 from window 18 to an output 25 of beam-guiding arrangement 24. Output 25 has, for example, a round output cross section.

Beam splitter 28 is configured to transmit beams 12 generated by beam source 10 to welding location 50 and to reflect process beams 16, which are emitted from welding location 50 and which proceed in the opposite direction to a beam direction of beams 12.

In the beam path between welding location 50 and beam splitter 28, a focusing arrangement, in particular a lens 26, is situated.

Focusing unit 42 is connected to a controlling element 44 which is configured to shift with the aid of an actuator motor 46 and an actuator motor 48 at least a part of the focusing unit, which is configured to guide the beams, at least in one plane transverse to the beam direction of process beams 16. With the aid of controlling element 44, process radiation 16 emitted from welding location 50 may thus be adjusted, by shifting the beam-guiding arrangement of focusing unit 42 in the plane, in such a way that process beams 16 are projected exactly onto window 18.

Welding device 1 has a processing unit 15 which is connected to focusing unit 42 via connecting line 64 and is thus able, by generating appropriate control signals, to activate controlling element 44, in particular actuator motors 46 and 48, to move the beam-guiding arrangement of focusing unit 42.

On the output side, the processing unit is connected to a light source 40 via a connecting line 66. Light source 40 is, for example, formed by an incandescent lamp, a luminescent diode, or a laser diode.

Light source 40 is configured to generate light beams 43. Welding device 1 is configured to direct light beams 43 in the opposite direction of process beams 16 through beam-guiding arrangement 24, through focusing unit 42, then via deflecting mirror 30 onto beam splitter 28 so that the light beams—in reverse direction to the beam path of process beams 16—fall onto welding location 50.

On the input side, the processing unit is connected to a user interface 68. User interface 68 has a rod-shaped control element 69. User interface 68 is configured to generate a user interaction signal as a function of a movement, in particular a swivel movement of control element 69, and to transmit this signal to processing unit 15 on the output side.

Processing unit 15 is configured to generate corresponding control signals as a function of the user interaction signal received on the input side, and thus as a function of the swivel movement of rod-shaped control element 69, and to transmit these control signals via connecting line 64 to focusing unit 42 for activating actuator motors 46 and 48. With the aid of control element 69 of user interface 68, light beam 43 thus generated by light source 40—reversely to beam direction of process beams 16—may be focused onto welding location 50 with the aid of controlling element 44. The welding device may be calibrated in this simple manner with the aid of visible light beam 43 so that process beams 16, which are reflected at beam splitter 28 and at beam-directing arrangement 30 and pass through focusing unit 42, may be guided to sensor 14 with the aid of beam-guiding arrangement 24. For this purpose, welding device 1 has another focusing unit 34, another focusing unit 36, and another focusing unit 38. Furthermore, welding device 1 has a beam splitter 32 which is configured and situated to reflect process beams 16 transmitted by focusing unit 34 on the output side, and to forward reflected process beams 16 to focusing unit 36 on the input side. Focusing unit 36 is configured to forward process beams 16 received on the input side to sensor 14 and to project them onto the latter.

Focusing unit 38 is configured to transmit light beams 43 generated by light source 40 to beam splitter 32 which is configured to transmit light beams 43 and to thus send them to focusing unit 34.

Focusing units 34, 36, 38, and 42 each have at least one lens, for example, which is configured to bundle the process beams and/or light beams 43 and to thus emit them as a beam bundle on the output side.

On the output side, processing unit 15 is connected to beam source 10 via a connecting line 60. Processing unit 15 is configured to generate a control signal for activating beam source 10 as a function of a sensor signal received via connecting line 62 on the input side and to transmit this control signal to beam source 10 on the output side. The control signal for activating beam source 10 may, for example, represent a beam intensity of beams 12. With the aid of welding device 1 thus configured, it is advantageously possible to calibrate the focusing of process beams 16 onto sensor 14, in particular via window 18, for example, prior to the start of a welding process or during an input calibration after manufacturing the welding device, with the aid of user interface 68 and light source 40. With the aid of window 18, it is advantageously possible to direct only process beams 16 emitted by a keyhole area 52 via beam-guiding arrangement 24, focusing unit 34, then via beam splitter 32 and focusing unit 36 onto sensor 14.

The sensor signal of sensor 14 thus represents only the process beams of process beams 16 emitted by keyhole are 52.

Processing unit 15 is thus able to control the welding process for connecting object 20 to another object 22 only as a function of the process beams emitted by keyhole area 52.

Processing unit 15 is, for example, formed by a microprocessor, a microcontroller or an FPGA (field-programmable gate array).

Figure 2:
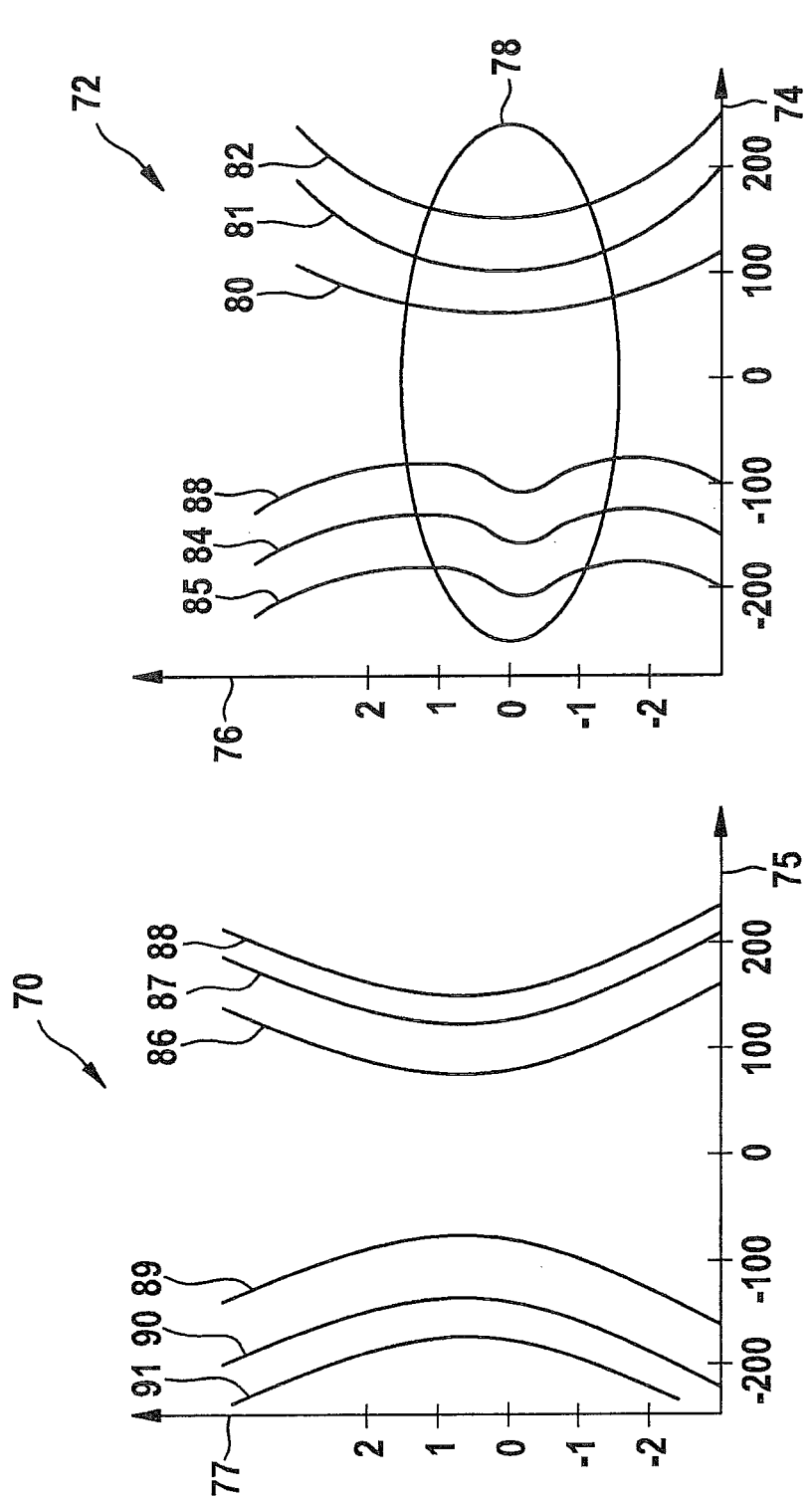
FIG. 2 shows an exemplary embodiment for two diagrams, each of which illustrates a process radiation emitted at the welding location into differing detection directions.

FIG. 2 shows a diagram 70 and a diagram 72. Diagram 70 has an abscissa 75 and an ordinate 77. Diagram 72 has an abscissa 74 and an ordinate 76.

Abscissa 74 represents a shift of the beam-guiding arrangement of focusing unit 42 illustrated in FIG. 1 in the plane, which is penetrated by process beams 16, along a first translation axis; abscissa 75 represents a shift of the beam-guiding arrangement of focusing unit 42 along a second translation axis which proceeds perpendicularly to the first translation axis in the shift plane.

The shift is plotted in micrometers on each of abscissas 74 and 75. Ordinates 76 and 77 each represent a focusing of the beam-guiding arrangement of focusing unit 42 along a translation axis which proceeds in the direction of the process beams and thus perpendicularly to the first and the second translation axes.

Diagram 70 has a pair of curves including curves 86 and 89, each of which represents the same beam density as the process beams detected by sensor 14. Diagram 70 also has a pair of curves including curves 87 and 90, each of which represents a beam density detected by sensor 14 in FIG. 1, this beam density being smaller than the beam density represented by curves 86 and 89.

Diagram 70 also has a pair of curves, including curves 88 and 91, each of which represents a beam density which is smaller than the beam density represented by curves 87 and 90. A symmetrical distribution of the beam density along a focusing direction which is perpendicular to the first and the second translation axes is visible.

Diagram 72 has a pair of curves, including curves 80 and 88 in the Figure, another pair of curves including curves 81 and 84, and another pair of curves including curves 82 and 85. Curves 80 and 88 in the Figure each represent focusing locations having the same beam density, detected by sensor 14 in FIG. 1, for example. Curves 81 and 84 each represent focusing locations having the same beam density. Curves 82 and 85 each represent focusing locations having the same beam density which is smaller than the beam density represented by curves 81 and 84. Area 78 which encloses an unsymmetrical area of the focusing is also illustrated. Area 78 represents a longitudinal extension of keyhole 52 illustrated in FIG. 1.

Figure 3:
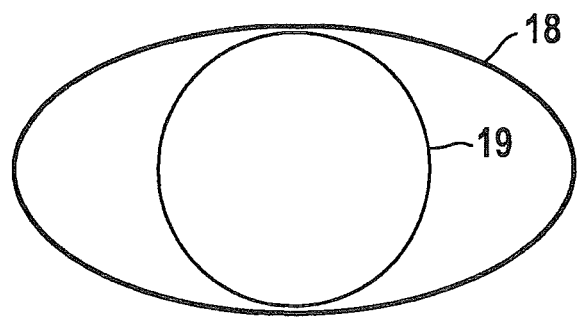
FIG. 3 shows an exemplary embodiment of a surface area which is penetrated by a process radiation emitted by a keyhole area at a welding location compared to a beam entrance window of a conventional beam-guiding arrangement.

FIG. 3 schematically shows an exemplary embodiment for a window 18 which has a pass-through area for the process beams, the pass-through area being delimited in a plane perpendicular to the process beams in such a way that only those process beams pass through window 18 which are emitted by a keyhole, for example, by keyhole 52 illustrated in FIG. 1. In this exemplary embodiment, the pass-through area of window 18 has an elliptical design. A circular surface area 19 is also illustrated. Circular surface area 19 is, for example, an entrance area of sensor 14 illustrated in FIG. 1 and/or an exit area of output 25 of beam-guiding arrangement 24. Window 18 is, for example, the beam entrance area of beam-guiding arrangement 24 illustrated in FIG. 1.

Beam-guiding arrangement illustrated in FIG. 1 has, for example, an exit area which is formed in correspondence with the entrance area of sensor 14, in particular in correspondence with surface area 19 illustrated in FIG. 3.

What is claimed is:

1. A welding device, comprising:
 a welding arrangement, including:
  a beam source configured to generate electromagnetic beams for absorption in an object to be welded at a welding location;
  a sensor to detect electromagnetic process beams generated during welding at the welding location, the sensor being configured to generate a sensor signal as a function of the detected process beams; and
  a processing unit, connected to the sensor and the beam source, configured to control at least one parameter of the beam generation of the beam source as a function of the sensor signal;
 wherein the welding arrangement is configured to delimit by a window a beam bundle of the emitted process beams in a plane transverse to the beam propagation direction, and wherein in the plane, the window has a longitudinal dimension which is greater than a transversal dimension of the window which is perpendicular to the longitudinal dimension.

2. The welding device of claim 1, further comprising:
 a beam-guiding arrangement to guide the process beams emitted from the welding location onto the sensor.

3. The welding device of claim 2, wherein the beam-guiding arrangement has a glass fiber bundle which is configured and situated to guide the emitted process beams from the welding location to the sensor.

4. The welding device of claim 1, wherein in the beam path between the beam source and the welding location, a beam splitter is situated which is configured to transmit the electromagnetic beams emitted by the beam source to the welding location, to reflect the process beams emitted from the welding location, and to direct them at least indirectly onto the sensor.

5. The welding device of claim 4, wherein the beam splitter is a semi-reflective mirror.

6. The welding device of claim 1, wherein the window is formed by a diaphragm in the beam path of the process beams.

7. The welding device of claim 1, wherein the window is formed by the glass fiber bundle, the glass fiber bundle having a window-shaped beam entrance cross section.

8. The welding device of claim 1, wherein the window has an oval cross section.

9. A method for controlling a welding process, the method comprising:
 generating electromagnetic beams, which are laser beams, and transmitting them onto at least one object at a welding location to be absorbed at least partially at the welding location, to heat up the object at the welding location, and to melt it at least partially;
 detecting electromagnetic process beams emitted from the welding location; and
 changing at least one parameter of the generation of the electromagnetic beams as a function of the detected process beams to influence the welding process, the process beams being delimited by a window in a plane transverse to the beam propagation direction so that only the process beams emitted by a keyhole at the welding location are detected for influencing the welding process.

10. The method of claim 9, wherein the parameter is a beam intensity of the electromagnetic beams or a pulse duration of pulsed electromagnetic beams.

\* \* \* \* \*